UNITED STATES PATENT OFFICE.

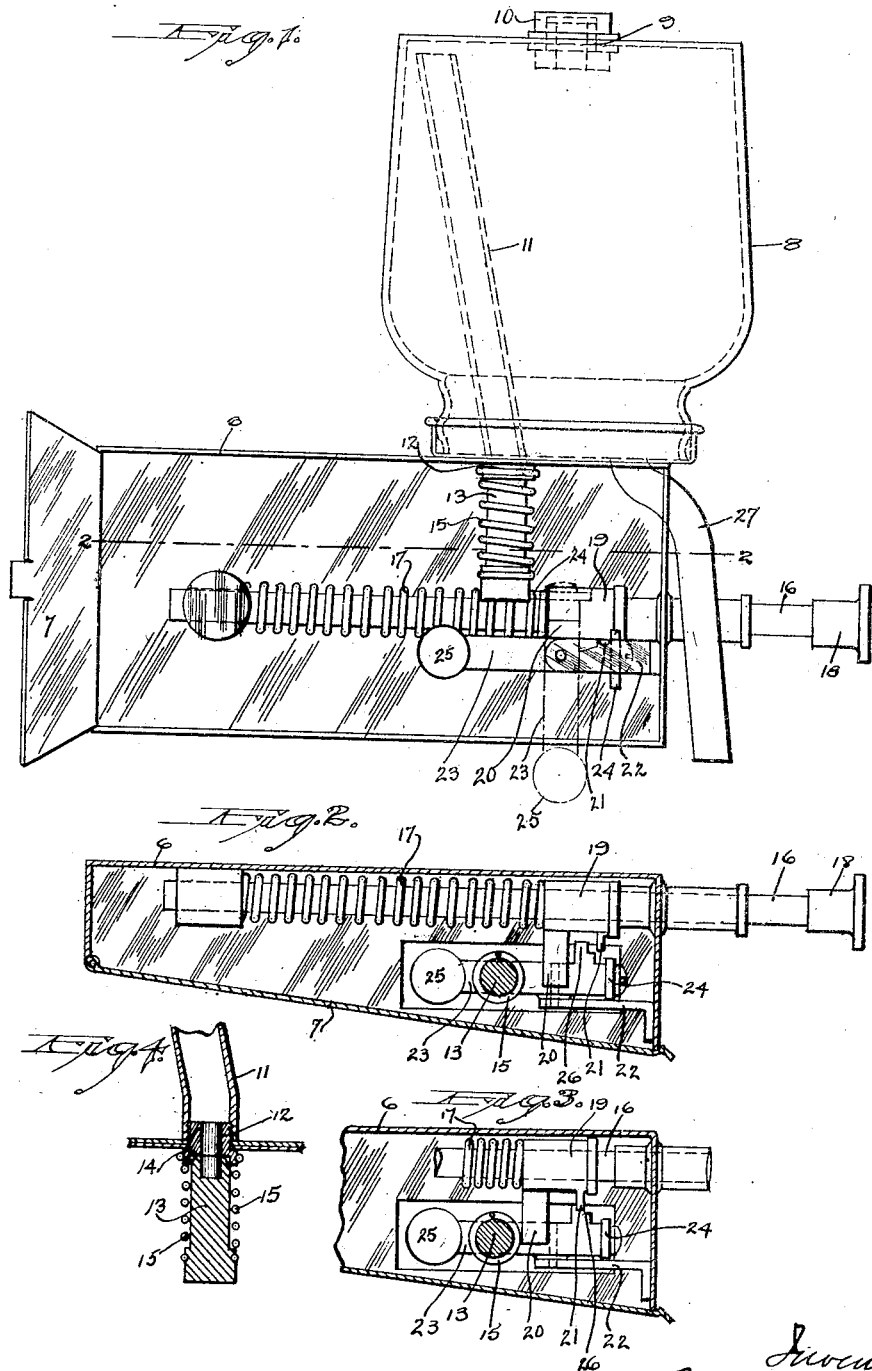

ELMER T. PHELPS, OF WESTFIELD, MASSACHUSETTS, ASSIGNOR OF ONE-HALF TO GEORGE H. BROWNE, OF NEW HAVEN, CONNECTICUT.

SANITARY BLESSING-FONT.

1,367,829.   Specification of Letters Patent.   Patented Feb. 8, 1921.

Application filed March 25, 1920. Serial No. 368,486.

*To all whom it may concern:*

Be it known that I, ELMER T. PHELPS, a citizen of the United States, residing at Westfield, in the county of Hampden and State of Massachusetts, have invented a new and useful Improvement in Sanitary Blessing-Fonts; and I do hereby declare the following, when taken in connection with the accompanying drawings, and the characters of reference marked thereon, to be a full, clear, and exact description of the same, and which said drawings constitute part of this application, and represent, in—

Figure 1, a side view of a sanitary blessing-font constructed in accordance with my invention, showing one side of the case open.

Fig. 2, a plan view on the line 2—2 of Fig. 1.

Fig. 3, a broken sectional view showing the plunger moved inward to a point near the limit of its inward movement.

Fig. 4, a broken sectional view of the vent-valve.

This invention relates to an improvement in blessing-fonts. In the more general use, blessing-fonts for holy water are open vessels into which the fingers are dipped, and obviously such a practice is unsanitary.

The object of this invention is to provide a closed font from which a few drops of water may be delivered at a single operation, and which will, therefore, be perfectly sanitary; and the invention consists in the construction as hereinafter described and particularly recited in the claims.

In carrying out my invention, I employ a casing 6 of any suitable design, herein shown as provided with a door 7 closing one side of the casing. Mounted upon the top of the casing, is a container 8 of any suitable design, and made from glass or other suitable material, and provided at its upper end with an opening 9 adapted to be closed by an air-tight plug 10 of any approved form. Mounted in the top of the casing and extending upward into the container 8, is an air-pipe 11, open at its upper end at a point near the top of the container 8. The lower end of the tube 11 has a contracted mouth 12 adapted to be closed by a valve 13 in the form of a long shank, the upper end of which enters a seat 14 formed in the lower end of the mouth. This valve 13 is connected with the mouth by a coil-spring 15 which is wound around the stem, and one convolution encircling the mouth 12 so as to hold the stem closely against the mouth to form an air-tight joint, yet yielding to permit the stem to be moved away from the mouth.

Mounted in the casing is a longitudinally movable plunger 16 suitably supported, and normally forced outward by a coil-spring 17, the plunger being provided at its outer end with a suitable knob or handle 18. Mounted on the plunger and forming a bearing for one end of the spring, is a sleeve 19 formed with an outwardly projecting lug 20 and with a finger 21 for the purpose as will hereinafter appear.

Pivotally mounted in a bracket 22 secured in the casing, is a lever 23 arranged in the line of the valve-stem 13, provided at its head with a contact-face 24, preferably of leather, and enlarged at its outer end 25 to counter-balance and normally move it to a vertical position. The lever is also formed with a lip 26 adapted to be engaged by the finger 21. Opening out of the bottom of the container is a discharge-spout 27.

To obtain a few drops of holy water, the plunger 16 is forced inward, and as it is forced inward, before the lug 20 passes the center of the line of mounting of the lever 23, the finger 21 will engage with the upper surface of the lip 26 and so maintain the lever in a horizontal position until the plunger has moved so far forward as to cause the finger 21 to pass beyond the lip 26. As it passes beyond this lip, the lever will move to a vertical position and in so moving, the hammer-end 24 will strike the lower end of the valve-stem 13 so as to slightly move the same and open the mouth of the vent-tube sufficiently to admit a small quantity of air, which, entering the container, will allow two or three drops of water to escape through the discharge-tube 27 onto the fingers of the devotionalist. It will be understood that the blow imposed against the lower end of the valve-stem will be by an over-motion of the lever, so that in its normal position and after it has struck the blow, it will permit the valve-stem to assume its normal or closed position. When the plunger is released, the spring 27 will force it outward and the lug 20 will tend to move the lever to a horizontal position, but before it has assumed the horizontal position, the finger 21 will be passed beyond the lip 26 so as not to interfere with the return of the lever to a horizontal position.

I thus provide in a very simple manner, a blessing-font from which a few drops of water, and only a few, will be discharged by a single movement of the plunger, while the water is contained in an air-tight receptacle, and hence safe from contamination. It is obvious that a device of this kind may be made highly ornamental, and the bearings will be muffled so that no noise is caused by the operation of the mechanism.

I claim:

1. A blessing-font comprising a container, a vent-tube extending upward into the container, a valve-stem adapted to yieldingly close the lower end of the vent-tube, a discharge-pipe opening out of the bottom of the container, and means including a swinging hammer for moving said valve-stem to momentarily open the lower end of the vent-tube.

2. A blessing-font comprising a container, a discharge-pipe opening in the lower end thereof, a vent-tube extending upward into said container, a valve-stem connected with the lower end of said vent-tube, a pivotal hammer-lever normally held in a horizontal position, and means for releasing the said hammer-lever whereby it will assume a vertical position and slightly move the said valve-stem.

3. A blessing-font comprising a casing, a container mounted upon the upper end thereof, said container provided with a discharge opening, a vent tube extending upward into said container, a valve-stem connected with said vent-tube by a spring by which the vent-tube is normally closed, a longitudinally movable plunger, a spring normally moving said plunger outward, a hammer-lever pivotally mounted in the casing with its plane of movement co-incident with the said valve-stem, one end of the hammer-lever adapted to impact against the lower end of the valve-stem when the hammer-lever assumes a vertical position, a sleeve on said plunger formed with a lug and with a finger, said hammer-lever formed with a lip for engagement by said finger whereby when the plunger is moved inward, the hammer-lever will be suddenly released substantially as described.

In testimony whereof, I have signed this specification in the presence of two subscribing witnesses.

ELMER T. PHELPS.

Witnesses:
J. LYMAN GRAY,
DORIS M. DUNN.